US006683429B2

(12) United States Patent
Pringle et al.

(10) Patent No.: US 6,683,429 B2
(45) Date of Patent: Jan. 27, 2004

(54) ELECTRIC POSITIONAL ACTUATOR

(75) Inventors: Hal Pringle, Bloomfield, MI (US); Robert Keefover, Farmington Hills, MI (US); Michael Halsig, Warren, MI (US); John Duddles, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 61 days.

(21) Appl. No.: 10/128,842

(22) Filed: Apr. 24, 2002

(65) Prior Publication Data

US 2003/0201742 A1 Oct. 30, 2003

(51) Int. Cl.[7] .................................................. H02P 1/04

(52) U.S. Cl. ....................... 318/466; 318/671; 123/399; 123/361; 123/403; 251/129.11

(58) Field of Search ................................ 318/671, 466; 123/399, 361, 403; 251/129.11

(56) References Cited

U.S. PATENT DOCUMENTS 4,671,235 A * 6/1987 Hosaka ....................... 123/352
4,867,122 A * 9/1989 Kono et al. ................. 123/396
5,265,572 A * 11/1993 Kadomukai et al. ........ 123/396
5,301,646 A * 4/1994 Doi et al. .................... 123/399
5,429,090 A * 7/1995 Kotchi et al. ............... 123/396
5,492,097 A * 2/1996 Byram et al. ............... 123/396
5,624,269 A * 4/1997 Kanamori .................... 439/83
5,803,355 A * 9/1998 Ureshino et al. ............. 236/13
5,868,114 A * 2/1999 Kamimura et al. ......... 123/399

* cited by examiner

*Primary Examiner*—Rita Leykin
(74) *Attorney, Agent, or Firm*—Warn, Burgess & Hoffmann, P.C.

(57) ABSTRACT

An electric positional actuator that includes a default device for positioning the actuated device in a default position. The actuator includes an electric motor that controls the rotational position of a shaft through a gear system. When the shaft rotates, it moves a link-bar that actuates the actuated device. A rotational sensor coupled to a printed circuit board detects the position of the shaft, and provide a feedback signal of the shaft's position. The default device includes a spring wrapped around the shaft. When the link bar is rotated away from its default position, one leg of the spring remains in contact with a housing spring boss while the other leg of the spring is in contact with the link bar opposing the movement and trying to return the link-bar to the default position.

25 Claims, 4 Drawing Sheets

ELECTRIC POSITIONAL ACTUATOR

BACKGROUND OF THE INVENTION

1. Field of the Invention

This invention relates generally to an electric positional actuator and, more particularly, to an electric positional actuator employing a default positioning device for returning an actuated device to a desired default position in the event of actuator failure, where the actuator has particular application for controlling air flow through a turbocharger or a supercharger.

2. Discussion of the Related Art

In a four-stroke internal combustion engine, the combustion air and fuel mixture typically enters the cylinders of the engine under atmospheric pressure. By pressurizing the combustion air before it enters a cylinder, more fuel can be mixed with the high-pressure air to obtain the desired air/fuel mixture, and thus, more power can be delivered for each stroke of the cylinder. A supercharger employs a compressor driven by the engine to increase the combustion air pressure. However, the power increase from the cylinders is partly lost due to the parasitic losses from driving the compressor by the engine. A turbocharger uses the exhaust gas pressure to drive a turbine. A compressor mounted on the same shaft as the turbine is rotated by the turbine, and is thereby used to increase the combustion air pressure. Thus, the compressor is not coupled to the engine, and the losses associated therewith are avoided.

Control valves are employed in a supercharger and a turbocharger to control the flow of combustion air through the compressor. One design employs a series of vanes that control the back-pressure in the turbine of a turbocharger to control turbine speed. Other turbocharger or supercharger designs employ a valve flapper member that controls air flow through the turbine or compressor. A suitable actuator is used to position the valve member or the vanes in the desired location. It would be desirable to provide a default device within the actuator so that the valve member or vanes remain at a desirable position in the event of actuator failure so that the engine keeps running.

U.S. Pat. No. 5,492,097 issued Feb. 20, 1996 to Byram et al. discloses a throttle body valve for regulating the flow of combustion air to an internal combustion engine. The valve includes a valve member selectively positionable between a minimum air flow position and a maximum air flow position in a combustion air passage extending through the valve. A default position is defined between the minimum and maximum air flow positions to allow the engine to operate if the actuator fails. A first end of a biasing member applies a force against the valve member towards the default position when the valve member is in the minimum air flow position, and a second end of the biasing member applies a force against the valve member towards the default position when the valve member is in the maximum air flow position.

SUMMARY OF THE INVENTION

In accordance with the teachings of the present invention, an electric positional actuator is disclosed that includes a default actuation device for positioning the actuated device in a default position in the event of actuator failure. The actuator has particular application for controlling air flow in a turbocharger or supercharger, but can be used for controlling many other devices and systems. The actuator includes an electric motor that controls the rotational position of a shaft through a gear system. When the shaft rotates, it moves a link-bar that actuates the actuated device. The actuator further includes a printed circuit board having a microprocessor and related circuitry. External control signals cause the microprocessor to activate the motor to position the shaft at the desired location. A rotational sensor coupled to the circuit board detects the position of the shaft, and provides a feedback signal to the microprocessor of the shaft's position.

The default device positions the shaft in a default position in the event of actuator failure. The default device includes a spring wrapped around the shaft. One end of the spring is positioned on one side of a lever arm coupled to the link-bar, and an opposite end of the spring is positioned on the other side of the lever arm. Therefore, the shaft rotates against the bias of the spring in both directions. If motor power is not applied to the shaft, then the spring holds the shaft in the default position.

Additional objects, advantages and features of the present invention will become apparent to those skilled in the art from the following discussion and the accompanying drawings and claims.

DETAILED DESCRIPTION OF THE EMBODIMENTS

The following discussion of the embodiments of the invention directed to an electric positional actuator is merely exemplary in nature, and is in no way intended to limit the invention or it's applications or uses. Particularly, the actuator of the invention is described herein as being used to control air flow in a turbocharger or a supercharger. However, as will be appreciated by those skilled in the art, the actuator of the invention has application for actuating many other types of actuated devices.

Figure 1:
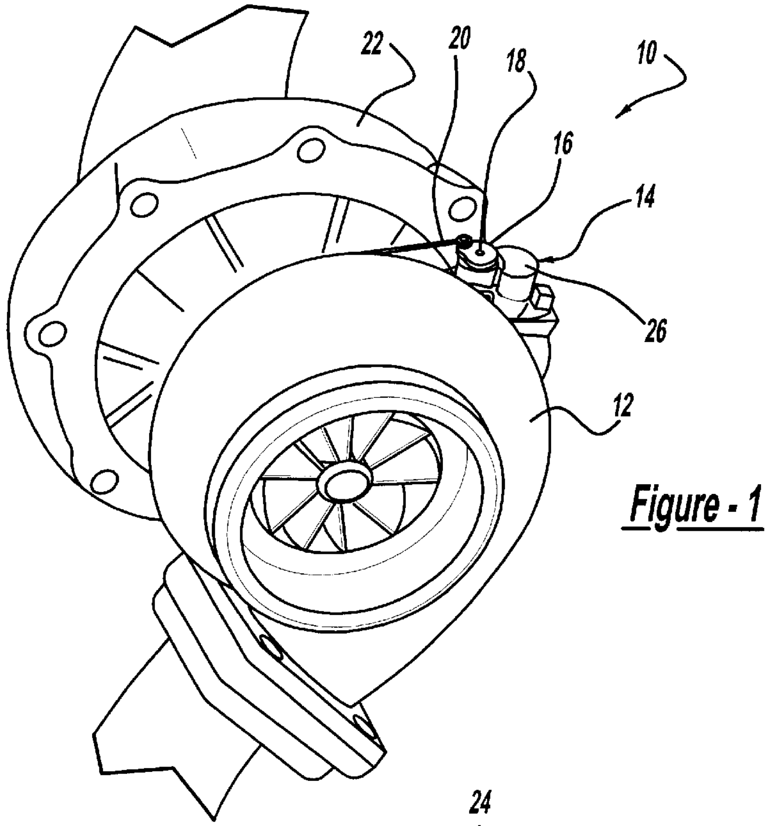
FIG. 1 is a perspective view of an electric positional actuator, according to the invention, coupled to a turbocharger.

FIG. 1 is a perspective view of a turbocharger 10 including a turbine 12, a compressor 22 and an electric positional actuator 14, according to an embodiment of the present invention. The turbocharger 10 is intended to represent any turbocharger known in the art that includes a valve (not shown) for controlling the flow of air through the turbocharger 10. One end of a link-bar 16 is coupled to an output shaft 18 of the actuator 14 and the other end of the link-bar 16 is coupled to one end of a linkage 20. The other end of the linkage 20 is coupled to the valve. Rotation of the shaft 18 imparts linear actuation to the link-bar 16 to move the linkage 20 and control the position of the valve within the turbocharger 10. Actuation of the shaft 18 will be described in more detail below.

Figure 2:
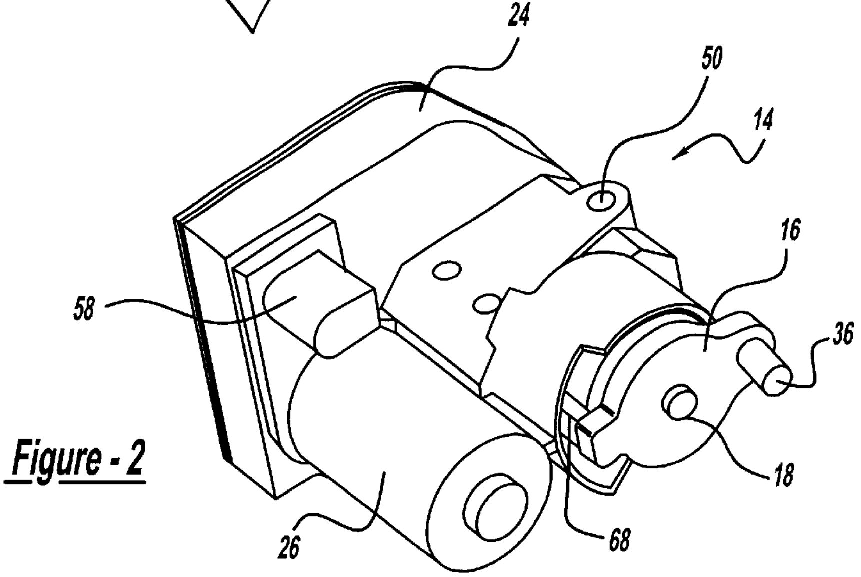
FIG. 2 is a front perspective view of the actuator shown in FIG. 1 separated from the turbocharger.
Figure 3:
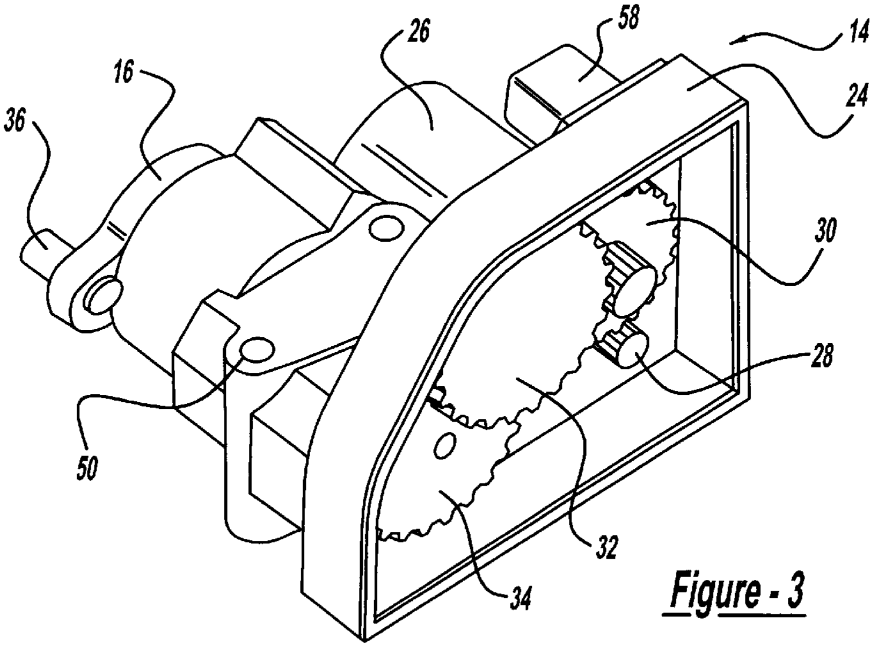
FIG. 3 is a back perspective view of the actuator shown in FIG. 2.
Figure 4:
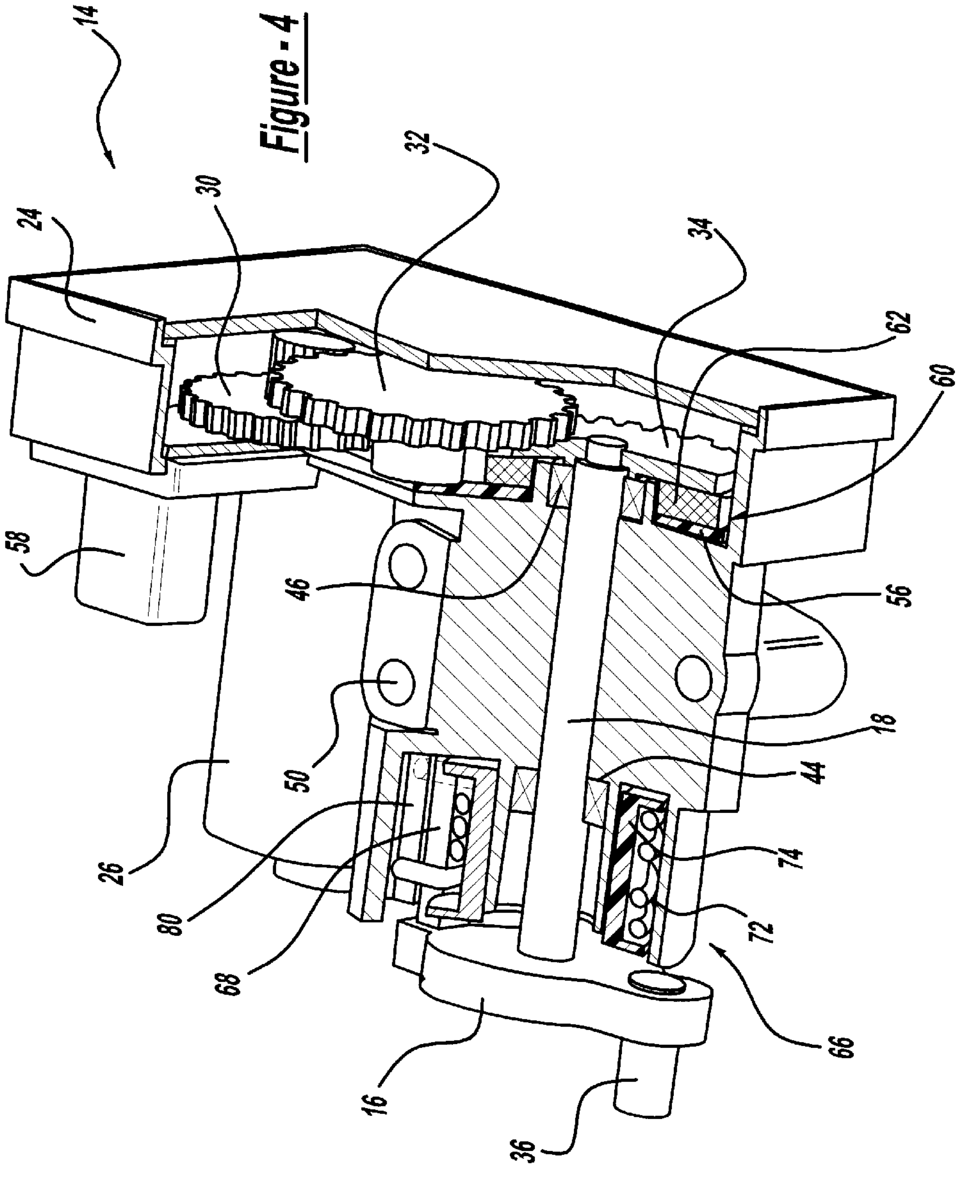
FIG. 4 is a cut-away perspective view of the actuator shown in FIG. 2.

FIG. 2 is a front perspective view, FIG. 3 is a back perspective view and FIG. 4 is a cut-away perspective view of the actuator 14 separated from the turbocharger 10. The actuator 14 includes an outer housing 24 made of a cast metal in this embodiment. An electric DC motor 26 is mounted within the housing 24, and includes a rotor rotatable therein. The motor 26 can be any motor of the proper size and output torque suitable for the purposes described herein. A shaft (not shown) rotated by the motor rotor is coupled to a motor shaft gear 28. The shaft gear 28 meshes with a first idler gear 30, and the first idler gear 30 meshes a second idler gear 32. The second idler gear 32 meshes with a shaft gear 34 rigidly mounted to one end of the shaft 18, as shown. The gears 28, 30, 32 and 34 transmit the rotational energy from the motor 26 to the shaft 18 and provide increased torque. The gears 28, 30, 32 and 34 provide a flexible gear ratio between the motor 26 and the shaft 18 to achieve various torque and response characteristics. The gear-train flexibility can include a dual or single idler gear system dependent on requirements.

When the motor 26 rotates, the shaft 18 rotates through the gears 28, 30, 32 and 34. The direction that the motor 26 rotates determines the direction that the shaft 18 rotates. Therefore, when the motor 26 rotates, the shaft 18 imparts a linear motion to the link-bar 16 in the appropriate direction, which moves a link-pin 36 coupled to the linkage 20, thus moving the valve.

The shaft 18 is rotatable on a pair of bearings 44 and 46. In this embodiment, the bearings 44 and 46 are ball bearings. However, as will be appreciated by those skilled in the art, other types of bearings, such as needle bearings, suitable for the purposes described herein can be used. In an alternate embodiment, the bearings 44 and 46 can be suitable bushings. The bearings 44 and 46 are press fit into a common housing 24. This provides and maintains the alignment of the shaft 18. Mounting bores 50 extend through the housing 24 to accept bolts (not shown) that secure the actuator 14 to the turbocharger, or other suitable location.

A printed circuit board (PCB) 56 is mounted to the housing 24 proximate the gears 28–34, as shown. The PCB 56 includes a microprocessor and related circuitry (not shown) for controlling the operation of the actuator 14, as discussed herein. An electrical connector 58 is coupled to the housing 24, and allows external control and power signals to be electrically coupled to the PCB 56 and the microprocessor. The connector 58 is mounted directly to the housing 24 to eliminate unwanted stress on the PCB 56. A suitable electrical connector (not shown) is electrically coupled to the connector 58 and to a control circuit (not shown), such as a vehicle controller, to control the actuator 14. In alternate embodiments, the microprocessor does need to be mounted in the housing 24, but could be at any suitable location.

A rotational sensor 60 is provided to detect the position of the shaft 18. The sensor 60 and associated sensor circuitry are electrical components mounted to the PCB 56. In this embodiment, the sensor 60 is a magnetic Hall Effect sensor employing magnets 62. However, as will be appreciated by those skilled in the art, other types of sensors, such as inductors, potentiometers, etc., can be employed for this purpose. The sensor 60 provides feedback for improving actuator performance. The sensor 60 allows the microprocessor to learn the systems hard stop positions, and reduce the speed at which the actuator 14 approaches the stops. Further, the sensor 60 allows the optimum actuator position to be determined, and provide redundant feedback of the obtained position to verify proper system operation. In other words, the sensor 60 gives the actual rotational position of the shaft 18, and this position is compared to the desired position by the microprocessor.

Figure 5:
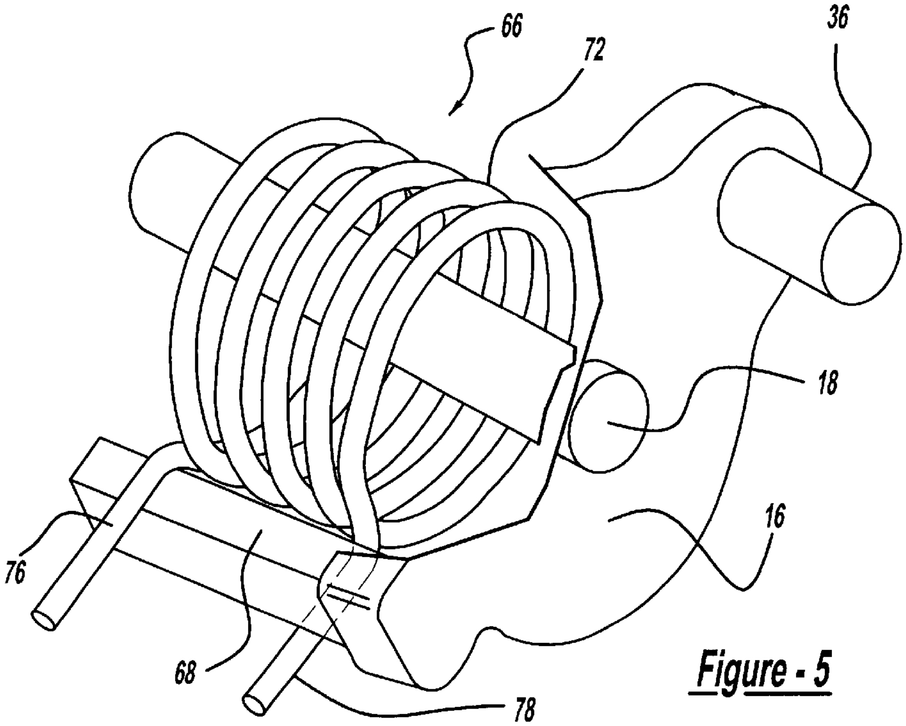
FIG. 5 is a perspective view of a default positioning spring, according to the invention, for positioning the actuator output shaft to a desired position in the event of actuator failure.
Figure 6:
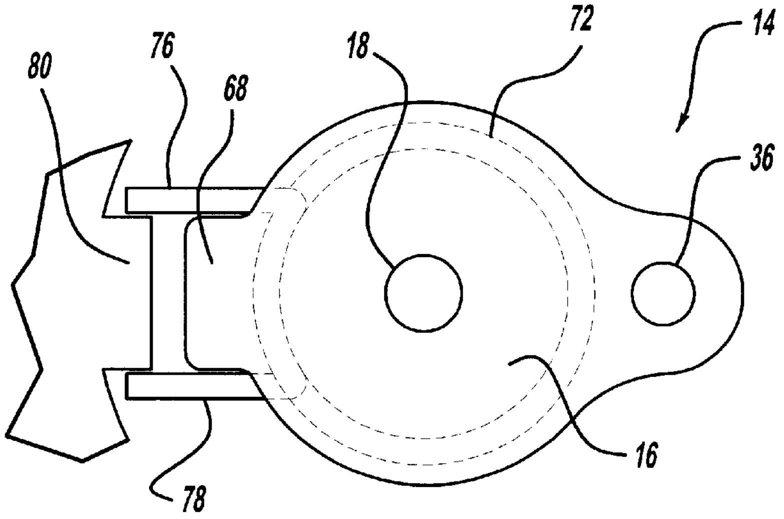
FIG. 6 is a cut-away, cross-sectional view of the actuator of the invention showing the ends of the default spring relative to a spring boss in the default position.
Figure 7:
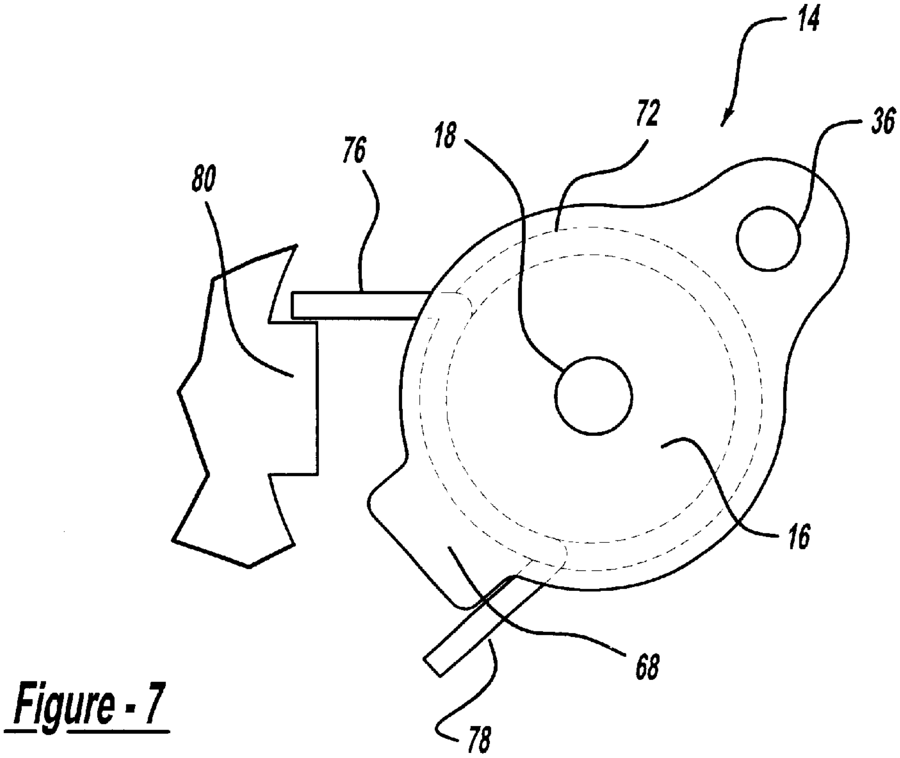
FIG. 7 is a cut-away, cross-sectional view of the actuator of the invention showing one end of the default spring separated from the spring boss.

According to the invention, the actuator 14 employs a default positioning device 66 that puts the actuator 14 in a desired default or fail-safe position in the event of a system or an actuator failure. Therefore, the vehicle, or other actuated device, is able to function if the actuator 14 becomes inoperable. FIG. 5 is a perspective view of the default positioning device 66 separated from the actuator 14. The device 66 includes a lever arm 68 rigidly mounted to the link-bar 16, or part of the link bar 16, and a spring 72 formed around a spring bushing 74. The spring bushing 74 acts to reduce friction. The spring 72 is a helical spring in this embodiment, and has a certain spring bias for the purposes described herein. Other designs may employ other types of spring elements within the scope Of the present invention. The spring 72 includes a first end 76 positioned against one side of the lever arm 68, and a second end 78 positioned against an opposite side of the lever arm 68, as shown. FIGS. 6 and 7 are cut-away, cross-sectional views of the actuator 14 showing the ends 76 and 78 of the spring 72 positioned on opposite sides of a housing spring boss 80.

When the shaft 18 is in the position shown in FIG. 5, the spring 72 is under minimal bias, and the shaft 18 is in the default position. The width of the arm 68 and the housing spring boss 80 are the same so that there is little or no torque applied to the shaft 18 at the default position. Torsional forces increase as misalignment between the arm 68 and the spring boss 80 increases. This default position is selected so that the linkage 20 positions the flow valve in the turbocharger 10 at the desired location for proper vehicle operation if the actuator 14 fails. If the shaft 18 rotates in one direction from the default position, one of the ends 76 or 78 applies a force against the arm 68 when the opposing leg 76 or 78 of the spring 72 is in contact with the spring boss 80 so that the spring 72 is under tension. The motor force is enough to rotate the shaft 18 against the spring bias to the desired position, but the spring bias moves the shaft 18 back to the default position when the motor force is not present. If the shaft 18 rotates in the other direction from the default position, the other of the ends 76 or 78 applies a force against the arm 68 when the opposing leg 76 or 78 of the spring 72 is in contact with the spring boss 80 so that the spring 72 is under tension. The circumferential orientation of the lever arm 68 relative to the shaft 18 can be adjusted in various designs to allow the default position to be at any angular position within the normal travel of the actuator 14. The default position of the actuator 14 can prevent overspeeding of the turbocharger 10, or allow the operation of the engine at some reduced power level should the actuator 14 fail. The design can provide default positioning anywhere within the normal travel of the actuator 14.

The foregoing discussion describes merely exemplary embodiments of the present invention. One skilled in the art would readily recognize that various changes, modifications and variations can be made therein without departing from the spirit and scope of the invention as defined in the following claims.

What is claimed is:

1. An actuator comprising:

a housing including a spring boss;

a motor mounted to the housing;

a shaft coupled to the motor and extending along a shaft axis, said motor operable to cause the shaft to rotate;

a link-arm coupled to the shaft, said link-arm including a lever arm extending along an axis substantially parallel to the shaft axis and adjacent to the spring boss; and a spring assembly positioned around the shaft, said spring assembly including a spring having a first end and a second end, said first end of the spring being positioned on one side of the lever arm and the spring boss, and said second end of the spring being positioned on another side of the lever arm and the spring boss, said spring being operable to position the shaft in a default position.

2. The actuator according to claim 1 wherein the spring assembly includes a spring bushing, said spring being wrapped around the spring bushing.

3. The actuator according to claim 1 wherein the spring is a helical spring wound around the shaft.

4. The actuator according to claim 1 wherein the shaft is coupled to the motor by at least one idler gear.

5. The actuator according to claim 4 wherein the at least one idler gear increases the output torque of the motor.

6. The actuator according to claim 4 wherein the at least one idler gear is a plurality of idler gears.

7. The actuator according to claim 1 further comprising a printed circuit board, said printed circuit board including a processor, said processor being responsive to control signals to control the operation of the motor.

8. The actuator according to claim 1 further comprising a sensor, said sensor sensing the rotational position of the shaft.

9. The actuator according to claim 8 wherein the sensor is mounted on a printed circuit board, said printed circuit board including electronic elements for controlling the operation of the actuator.

10. The actuator according to claim 8 wherein the sensor is selected from the group consisting of inductive sensors, Hall Effect sensors and potentiometers.

11. The actuator according to claim 1 further comprising an electrical connector mounted to the housing, said electrical connector providing electrical signals to the actuator.

12. The actuator according to claim 1 further comprising first and second shaft bearings, wherein the first shaft bearing is positioned around a first end of the shaft and the second shaft bearing is positioned around a second end of the shaft, said first and second shaft bearings being pressed into the housing.

13. The actuator according to claim 1 wherein the actuator controls air flow in or to a turbocharger or a supercharger.

14. An actuator comprising:

a housing including a spring boss;

a motor mounted to the housing;

a shaft coupled to the motor by a series of gears, wherein rotation of the motor drives the gears to rotate the shaft, said shaft extending along a shaft axis;

a printed circuit board mounted within the housing, said printed circuit board including a processor being responsive to control signals to control the operation of the motor;

a link-arm coupled to the shaft, said link-arm including a lever arm extending along an axis substantially parallel to the shaft axis and adjacent to the spring boss; and a spring assembly positioned around the shaft, said spring assembly including a helical spring having a first end and a second end, said first end being positioned on one side of the lever arm and the spring boss, and said second end being positioned on an opposite side of the lever arm and the spring boss, said spring being operable to position the shaft in a default position.

15. The actuator according to claim 14 wherein the spring assembly includes a spring bushing, said spring being wound around the spring bushing.

16. The actuator according to claim 14 further comprising a sensor, said sensor sensing the rotational position of the shaft and providing a signal to the processor indicative of the position of the shaft.

17. The actuator according to claim 16 wherein the sensor is a Hall Effect sensor mounted on the printed circuit board.

18. The actuator according to claim 14 further comprising an electrical connector mounted to the housing, said electrical connector providing electrical signals to or from the actuator.

19. The actuator according to claim 14 further comprising first and second shaft bearings, wherein the first shaft bearing is positioned around a first end of the shaft and the second shaft bearing is positioned around a second end of the shaft, said first and second shaft bearings being pressed into the housing.

20. The actuator according to claim 14 wherein the series of gears includes a first shaft gear mounted to the motor, a second shaft gear mounted to the shaft and a plurality of idler gears intermeshed therebetween.

21. The actuator according to claim 14 wherein the actuator controls air flow in or to a turbocharger or a supercharger.

22. An actuator comprising:

a housing including a spring boss;

a DC motor mounted to the housing;

a shaft rotatably mounted within the housing and extending along a shaft axis, said shaft being rotatable on first and second bearings press fit into a common block of the housing;

a plurality of intermeshed gears including a first shaft gear rigidly coupled to a motor shaft of the motor, a second shaft gear rigidly coupled to one end of the shaft, and at least one idler gear therebetween, wherein the shaft rotates in response to rotation of the motor through the plurality of gears;

a printed circuit board mounted within the housing proximate the plurality of gears, said printed circuit board including a processor providing control signals to control the operation of the motor;

a sensor mounted to the printed circuit board and sensing the rotational position of the shaft;

an electrical connector mounted to the housing, said electrical connector providing electrical signals to the printed circuit board;

a link-arm coupled to the shaft, said link-arm including a lever arm extending along an axis substantially parallel to the shaft axis adjacent to the spring boss; and a spring assembly positioned around the shaft, said spring assembly including a helical spring wrapped around a spring bushing and including a first end and a second end, said first end being positioned on one side of the lever arm and the spring boss, and said second end being positioned on an opposite side of the lever arm and the spring boss, said spring being operable to position the shaft in a default position.

23. The actuator according to claim 22 wherein the sensor is a Hall Effect sensor mounted on the printed circuit board.

24. The actuator according to claim 22 wherein the at least one idler gear is a plurality of idler gears.

25. The actuator according to claim 22 wherein the actuator controls air flow in or to a turbo charger or a supercharger.

* * * * *